United States Patent [19]
Anthonyson

[11] Patent Number: 5,414,624
[45] Date of Patent: May 9, 1995

[54] AUTOMATED VEHICLE PARKING SYSTEM

[75] Inventor: Robert B. Anthonyson, Sunapee, N.H.

[73] Assignee: Avid Systems Corporation, Chicago, Ill.

[21] Appl. No.: 148,983

[22] Filed: Nov. 8, 1993

[51] Int. Cl.⁶ .................. G06F 15/21; G07B 15/02
[52] U.S. Cl. ................. 364/424.01; 364/467; 364/406; 235/378; 235/384; 340/932.2
[58] Field of Search ............ 364/424.01, 467, 406, 364/401; 340/932.2, 933, 937; 342/42, 51, 114; 235/384, 375, 378; 369/90

[56] References Cited

U.S. PATENT DOCUMENTS

| | | | |
|---|---|---|---|
| 3,484,586 | 12/1969 | Wilson et al. | 235/61.6 |
| 3,604,898 | 9/1971 | Magnusson | 194/4 R |
| 3,815,718 | 6/1974 | Singer | 364/467 |
| 3,993,975 | 11/1976 | Long, Jr. et al. | 340/932.2 |
| 4,075,632 | 2/1978 | Baldwin et al. | 342/51 |
| 4,207,468 | 6/1980 | Wilson | 324/29.5 |
| 4,360,810 | 11/1982 | Landt | 342/44 |
| 4,587,410 | 5/1986 | Milnes | 235/382 |
| 4,603,390 | 7/1986 | Mehdipour et al. | 364/467 |
| 4,665,395 | 5/1987 | Van Ness | 340/932.2 |
| 4,739,328 | 4/1988 | Koelle et al. | 342/44 |
| 4,774,571 | 9/1988 | Mehdipour et al. | 348/148 |
| 4,782,345 | 11/1988 | Landt | 343/727 |
| 4,786,907 | 11/1988 | Koelle | 342/51 |
| 4,835,377 | 5/1989 | Brown | 235/492 |
| 4,876,540 | 10/1989 | Berthon et al. | 340/932.2 |
| 4,958,064 | 9/1990 | Kirkpatrick | 235/384 |
| 4,982,070 | 1/1991 | Bexin et al. | 235/378 |
| 5,003,520 | 3/1991 | Grieu et al. | 368/90 |
| 5,030,807 | 7/1991 | Landt et al. | 235/375 |
| 5,072,380 | 12/1991 | Randelman et al. | 364/406 |
| 5,311,186 | 5/1994 | Utsu et al. | 342/51 |

OTHER PUBLICATIONS

Ollivier, "Tiris: A Vehicle Tracking System Using Passive Radio Transponders", IEEE, Jun. 1993, pp. 1-8.

Primary Examiner—Kevin J. Teska
Assistant Examiner—Tan Q. Nguyen
Attorney, Agent, or Firm—Jones, Day, Reavis & Pogue

[57] ABSTRACT

An automated vehicle parking system for a parking facility that communicates with a vehicle approaching or leaving the facility with RF signals, or the like, that identify the vehicle and sends the vehicle identification number, time of day, and lane number to a central computer for calculating the parking cost based on rates for each individual vehicle stored in the computer.

3 Claims, 3 Drawing Sheets

AUTOMATED VEHICLE PARKING SYSTEM

BACKGROUND OF THE INVENTION

1. Field of the Invention

The present invention relates in general to vehicle parking systems and in particular to a parking system which automatically identifies a vehicle approaching the entrance or exit lanes to the parking facility and generates an appropriate set of responses such as opening the gate, illuminating a fee display or other sign information, posting accounting information and the like.

2. Description of Related Art

There are many different types of semiautomatic parking systems for vehicles such as motor vehicles including monthly pass cards, automatic ticket dispensers, and the like. In systems where time accounting is required for parking that is subject to charge periods, a card having an electronic memory is used where each memory location can be individually and irreversibly written in order to represent a time unit credit allocated to the holder of the card. Other systems use an electronic memory and a card reader, a portable terminal carried by a parking checker, a card having a magnetic track containing a confidential identification number, and a label for sticking to the windshield of a vehicle with the label bearing information that is unambiguously related to the information stored in the card. Still other systems use capacitive cards and reader systems. Some systems use an automatic fee determining system including means to totalize the amount of coins accepted by the system. Such system includes means for calculating the fee due from a parking ticket. The customer then inserts coins into a coin receptor and a "vend" is produced only when the total value of coins at least equals the calculated fee due. Other systems have an entrance station for dispensing a coded card and initiating opening of an entrance gate and an exit station for receiving the card, sensing any lapsed time, computing a toll at a predetermined time rate, collecting the correct toll, and initiating opening of the gate in response to the collection.

These systems all require the intervention of a human operator or an interaction between the vehicle occupant and a device such as a ticket dispenser and the like.

SUMMARY OF THE INVENTION

The present invention overcomes the disadvantages of the prior art by providing an automatic parking system that can identify a vehicle approaching an entrance or exit lane, and then, based on that identity, generate an appropriate set of responses such as opening a gate, illuminating a fee display, posting accounting information, preparing periodic statements to the owner of the vehicle, and the like.

In the present system, a vehicle will pull into an entrance lane until it can go no further because the entrance gate is closed. At this point, the vehicle must be detected. In some available systems, a sensor emits RF signals continuously and an approaching vehicle responds. Another system that could be used includes a detector that senses the car's presence and notifies an entrance lane controller circuit that may be a separate unit or a part of a host computer. The lane controller activates a sensor that sends a signal such as a radio frequency signal to the vehicle. If the vehicle is equipped with a compatible tag or transponder, a signal will return from the vehicle to the sensor. The sensor then relays that signal to the lane controller. The lane controller is a circuit that processes that signal and couples it to a host computer with specific information regarding the vehicle such as the identifier ID, the date and time of day, lane number, and the like. The lane controller circuit, if desired, may be contained within the host computer.

When the host computer receives the identification signal, it compares it to a complete list of recognized identification numbers contained in a database. If the identification number is found, additional information will then be known about the vehicle including the parker identification and the parking product such as monthly parker, debit, charge, and the like that pertain to this particular vehicle. That information is used to maintain a billing account for that identified vehicle. If the parker is authorized to use a product that allows entry such as daytime usage, weekend usage, or both, for example, then the system will treat the attempted entry as valid. The system will create a partial transaction record that includes the parker identification number, the parking product that is being used, the billing account, and the time of entry into the system. The system will also instruct the lane controller to open the gate.

If the vehicle is not authorized because of no identification, no valid identification, not authorized to use a suitable product, and the like, the system will not permit entry. However, if the facility also allows transient parkers, the vehicle operator can be automatically issued a ticket which can be retrieved and the gate opened so that the vehicle can enter the facility. This entry, however, will not be administered by the present system.

Alternatively, a parker who is authorized to enter based on the present system may elect to pull a ticket to bypass the system.

As a vehicle approaches the exit lane, the detector, such as a loop detector, senses the vehicle's presence and notifies the exit lane controller. The exit lane controller activates a sensor to send a radio frequency signal to the vehicle. If the vehicle is equipped with a compatible tag or transponder, a signal will return from the vehicle to the sensor. The sensor then relays that signal to the lane controller processor. The lane controller processor again processes the signal and couples it to the host computer along with specific information such as the vehicle identification number, the date and time of day, lane number, and the like.

When the host computer receives that information, it compares the vehicle identification number to the database that contains the complete list of recognized identification numbers. If that identification number is found, the partial transaction record is located and additional information will be known about the vehicle including when it entered the parking facility, the billing account, and the product that accounts for this visit. The system will then calculate the appropriate cost. This cost information and instructions to open the gate are then sent to the lane controller. The cost information is also posted to an accounting system.

In the normal case, the lane controller will display the parking cost on an appropriate display monitor and the gate will open. However, if the vehicle does not have an authorized identification number, the typical explanation is that the parker used a ticket on entry. This ticket will not be processed by the system but instead by a system for transient parkers that uses personnel at the gate to take the ticket, calculate a cost, and collect the parking fee.

Thus, it is an object of the present invention to provide an automated vehicle parking system.

It is also an object of the present invention to provide an automated vehicle parking system that senses a vehicle, transmits an interrogation signal to the vehicle and, if the vehicle has a compatible tag or transponder, receives from the vehicle an identification number for use in system computers for calculating costs for that particular vehicle.

It is also an object of the present invention to provide an automated parking facility in which the gates are opened and closed according to a transponder signal received from the vehicle when interrogated.

It is still another object of the present invention to provide an automated vehicle parking system in which various parking products such as by the hour, by the day, monthly parkers, daytime only, weekend only, and the like can be applied to a particular vehicle, and the costs automatically calculated on a real time basis and stored in an accounting system from which periodic billings can be issued to the customer owning the vehicle or can be used in debit accounting.

BRIEF DESCRIPTION OF THE DRAWINGS

These and other objects of the invention will be more fully understood when taken in conjunction with the following detailed description of the drawings in which like numerals represent like elements and in which.

DETAILED DESCRIPTION OF THE DRAWINGS

Figure 1:
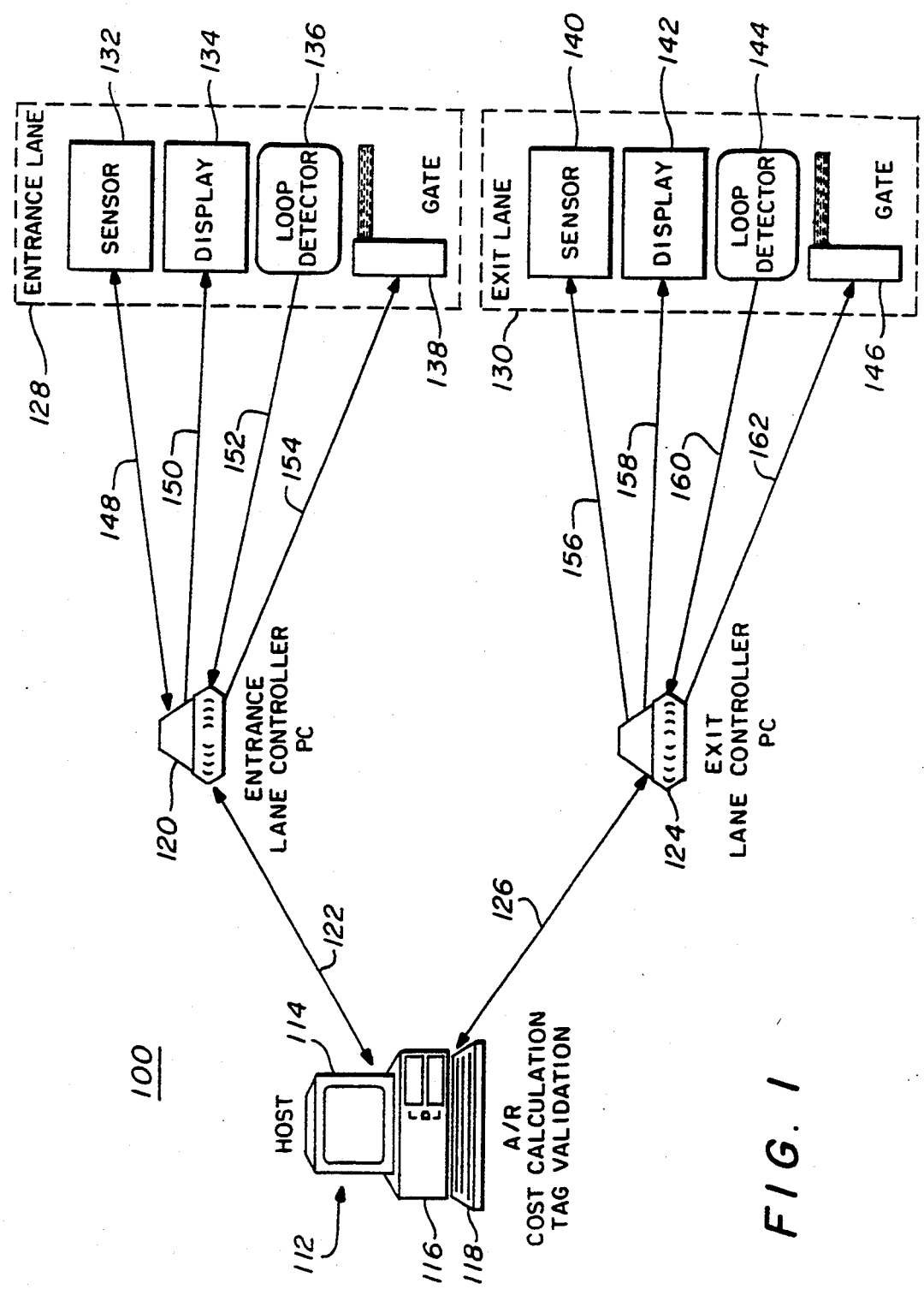
FIG. 1 is a general system overview diagram illustrating the operation thereof.

FIG. 1 is a block diagram illustrating the general system overview. The system 100 includes the host computer 112 that accomplishes the accounting, cost calculations, tag validation, and the like. The host computer 112 comprises a display screen 114, a computer 116, and a keyboard or other entry device 118 such as a mouse. The host computer 112 communicates with both the entrance lane controller computer 120 and the exit lane controller computer 124 through lines 122 and 126, respectively. The entrance lane controller is coupled to an entrance lane module 128 that includes a sensor 132, a display 134, a detector 136, such as a loop detector, and an entrance gate 138. In like manner, the exit lane controller communicates with an exit lane module 130, that, again, includes a sensor 140, a display 142, a detector 144, which again may be a loop detector, and an exit gate 146.

The sensor 132, 140 in both the entrance lane module 128 and the exit lane module 130 may be a sensor of the type disclosed in U.S. Pat. No. 5,030,807. It is an interrogator that sends a signal such as an RF signal to a remote transponder or tag, the signal including data intended to be received and/or stored in the tag. The tag or transponder modulates the received signal with data temporarily and/or permanently stored in the tag including data indicating the identity of the object to which the tag is attached. The sensors 132 and 140 have the capability of recognizing the identity of the tagged object from the returned signal. Displays 134 and 142 are typical image displays such as a television set, an LCD display, or LED's, for example. The detectors 136 and 144 are a mini-type of detector, such as a loop detector, that can sense the approach of a vehicle. Gates 138 and 146 are typically electrically controlled gates that can respond to a signal from the lane controllers 120, 124 to open the gates as signalled.

Thus the system uses off-the-shelf automatic vehicle identification equipment for access and revenue control.

As a vehicle approaches the entrance lane, gate 138 is closed. At this point, loop detector 136 senses the presence of the vehicle and notifies the entrance lane controller computer 120. The lane controller computer 120 activates sensor 132 through line 148 and causes sensor 132 to send a radio frequency signal to the vehicle. If the vehicle is equipped with a compatible automatic vehicle identifier tag or transponder, a signal will return from the vehicle to the sensor 132. The sensor 132 then relays that signal to the lane controller computer 120. The lane controller computer 120 processes the signal by removing duplicates and the like and passes the signal on to the host computer 112 along with specific information such as the vehicle identification number, date and time of day, and the lane number.

Figure 2:
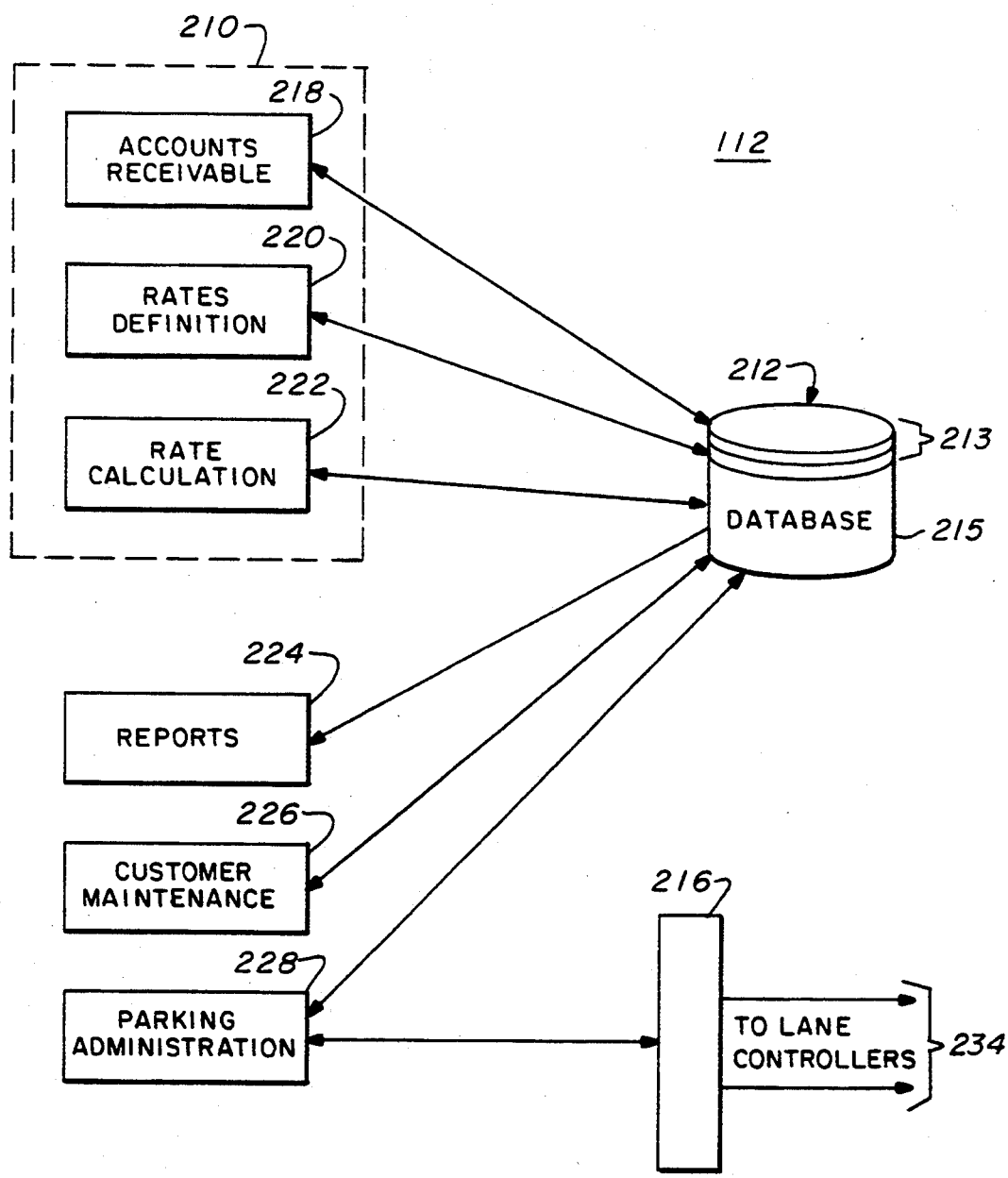
FIG. 2 is a diagrammatic representation of the host computer and its functions.

When the host computer 112 receives that information, it compares the vehicle identification number to a complete list of recognized identification numbers contained in database 215 (shown in FIG. 2). If the identification number is found, then additional information will be known about the vehicle including the parker identification and the parking product such as monthly, day, debit, charge, and the like. It also will know the billing account against which the parking activity should be charged. If an authorized vehicle ID is found, then it is determined if that vehicle has an authorized parking product. If it has, the system computer 112 will treat the attempted entry as valid. The system host 112 will create a partial transaction record that includes the parker identification number, the parking product being used, the billing account, and the time of day. The system host computer 112 will also instruct the lane controller 120 to open the gate 138.

If the would-be-parker is properly authorized, the gate 138 will have opened and the parker can drive through the gate. If the parker is not authorized, for example, has no identification number, no valid identification number, is not authorized to use an available or suitable product, and the like, the system will not permit entry. However, if the parking facility allows transient parkers, the parker can pull a ticket and enter the facility. However, this type of entry will not be administered by the present invention. Of course, a parker who is authorized to enter based on the present system may elect to pull a ticket to bypass the system if it is so desired.

The exit lane functions in a manner similar to the entrance lane. As the vehicle approaches the exit lane, the gate 146 is closed. At this point, the detector 144 which, again, may be a loop detector, senses the presence of the vehicle and signals the exit lane controller computer 124 on line 160. The lane controller 124 activates the sensor 140 on line 156 and causes it to send a radio frequency signal towards the vehicle. Again, if the vehicle is equipped with a compatible vehicle identifier tag or transponder, the signal will return from the vehicle to the sensor 140. The sensor 140 then relays that signal to the lane controller computer 124 on line 156. The lane controller computer 124 processes the signal and, again, passes it on to the host computer 112 along with the specific information such as the vehicle identifier number, date, time of day, and lane number. When the host computer 112 receives the vehicle identification number, it compares it to the database 215 (FIG. 2) that contains a complete list of recognized identification numbers. If the identification number is found, a partial transaction record can be located in the database and additional information will be known about the vehicle including the time it entered, the billing account, the parking product associated with that account, and the like. The system 112 will then calculate the appropriate costs. This cost information and instructions to open the gate 146 will be sent to the lane controller 124 on line 126. This cost information will also be posted to an accounting system 210 (FIG. 2).

Again, the lane controller computer 124 will cause the parking cost to be shown on display on 142 and the gate 146 will open. However, if the vehicle does not have an authorized identification number, it is presumed that the parker pulled a ticket on entry. This ticket will not be processed by the system but instead by a system for transient parkers that uses personnel such as cashiers at the gate to take the ticket, calculate a cost, and collect a parking fee. The host computer 112 will typically be a computer such as a 486/33 (or higher) running OS/2 ™ or other operating system, a keyboard, a mouse, and including a VGA monitor. It will typically be installed in the parking office. The lane controller computers will typically be 386/33 computers (or higher) with storage devices such as hard disk drives but without keyboards, monitors, or floppy drives. These computers may be installed near the lanes.

FIG. 2 is a block diagram of the details of the host computer 112. This computer includes an accounting system 210 and data storage 212 that include a Btrieve ™ 213 database or other database manager or file system. It also includes a communications board 216. The host computer 112 also includes a report submodule 224, a customer maintenance submodule 226, and a parking administration submodule 228. The host computer 112 will provide the lane controller computers 120 and 124 with a list of recognized tag or transponder ID numbers for use in an emergency condition only. In addition, a status code may supplement each recognized tag or transponder number so that the lane computers 120 and 124 can take the appropriate actions. There are several possible actions that can take place when a vehicle with a tag enters a lane. Some specialized actions are appropriate only at certain modules within the system. The description of each module will detail such specialized action. Thus the host computer 112 will provide standard actions such as recognizing the tag, providing the signal for opening the gate or changing and returning the tag status such as: tag not recognized, do not open gate; tag recognized, do not open gate, improper status received; tag recognized, do not open gate, deactivated tag; and tag recognized, do not open gate, stolen tag. These actions may also initiate various alarms, visual or otherwise, in the lane and in the parking facility office. A customer or user with a tag or transponder will not have the opportunity to override the tag or transponder other than by physically removing it, turning it off, or pulling a ticket at the time of entry.

Moreover, the lane computers 120 and 124 will transmit information about each attempted entrance or exit to the host computer through the lane controller interface 214. This information will include, for example only, a 26 character alphanumeric tag identifier, lane number, date, time of day, and action taken. The host computer 112 will then create a transaction record from the previous information to which it will add the name of the facility.

In addition, it could also add the name of the tag holder, the billing account, and the like.

Off-the-shelf tags or transponders provide for at least 26 characters of information on each tag since there will be an all-out attempt to have tag compatibility between regional toll-roads, bridges, tunnels, and multiple parking facilities. Most of the information will be for vehicle identification only. The tag will typically not contain any information that would associate it with a particular parking facility.

The host computer 112 provides a proper interface with the lane controllers through parking administration submodule 228. The programs in such submodule 228 allows the operators to turn off lanes, control gates, initiate batch posting of invoices, activate displays, and other administrative functions. In addition, accounting module 210 includes the accounts receivable submodule 218, a rates definition submodule 220, and the rate calculation submodule 222. The accounts receivable submodule 218 receives and posts the costs involved in each parking transaction. This submodule will generate periodic statements, such as on a monthly basis, and track the accounts receivable history.

The rates definition submodule 220 enables parking rates that are entered into the system to be modified as necessary. It allows the most complex rates to be easily input and changed. Moreover, the submodule 220 retains a history of all rates that were ever used and the system allows upcoming rates to be defined for any time in the future.

The rate calculation submodule 222 identifies the proper billing account and parking product to be identified for each parking visit. Then, at exit, the proper cost is calculated by the rate calculation submodule 222.

In addition, a report module 224 is provided. This submodule provides a large set of standard reports. These reports show parking activity by time of day, length of stay, cost, and the like. This module also allows the easy creation of additional reports by the parking operator.

The customer maintenance submodule 226 receives input information from the operator about the customer such as address, billing information, and vehicle information.

All of these submodules and the information contained therein are utilized by an algorithm in the host computer 112 to calculate the parking cost for each tag identified customer. The rate schedules, as defined in submodule 220, have a name, a grace period, and an ordered list of conditions and associated rate tables. The conditions define under what circumstances a rate table is applied. More than one rate table may be used in the calculation of the cost of a single garage entrance and exit. The conditions retained in the rates definition submodule 220 include entrance time interval such as, for example 6:00 a.m. to 8:00 a.m., and exit time interval which specifies the time of exit from the garage and the exit must occur in the specified interval, the duration interval that requires a length of stay that is between the minimum and maximum amounts of time set, the days of the week for the which the rates tables are valid, usually either Monday through Friday or Saturday and Sunday. The valid day of the week may be specified as a date rather than a specific day of the week. A calendar of holidays may be specified as part of the maintenance of the system. Further, an exit time limit and duration limit can also be stored in the rates definition module. A duration limit is a period of time used to limit application of the rate table for the condition. The duration limit is not used to determine if the condition is satisfied. The duration limit is used to limit the duration for which the rate table is applied. Thus, the first half hour of parking may be at a first rate, the second half hour at a second rate, the next two hours at a third rate and any additional hours at a fourth rate.

A rate table is associated with each condition by specifying its name. A discount rate may also be associated with the rate table for this condition. This allows selected discounts to be easily applied for selected classes of accounts. The algorithm for applying the rate table is used to search the ordered list of conditions for the first condition which is satisfied and then adding the rate calculated from the rate table associated with the condition. The entrance time is then updated using the maximum duration as specified earlier. If the remaining duration is less than the grace period, the rate calculation is finished otherwise the limit of conditions is searched again from the beginning. The rate table consists of a list of rates specified such as period, repeat, and rate. The period designates the period for which to apply the rate, for example a one-half hour interval. The repeat allows a number of periods over which to use the rate, for example, the rate is to be used for the next 3½ hours. Finally the specified rate table establishes the rate for each of the periods. To calculate the total rate, the first rate is applied for the first repeat number of periods. Then the second rate is applied for the second repeat number of periods. As many of the rates are used as needed to calculate the rate for the entire duration. The actual calculation, of course, takes place in the rate calculation submodule 222.

Figure 3:
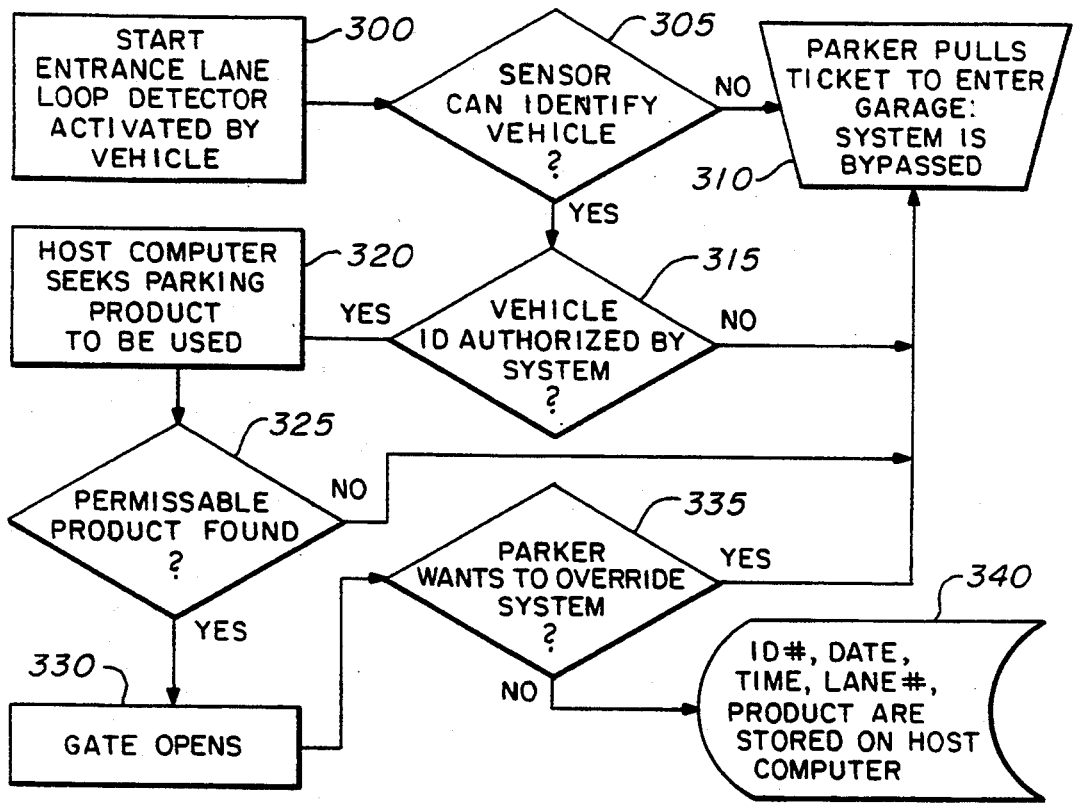
FIG. 3 is a flow chart illustrating the operation of the system as a vehicle approaches the entrance of the lane.

FIG. 3 is a flow chart illustrating the operation of the system as a vehicle approaches the entrance lane. At block 300, the loop detector 136 in the entrance lane is activated and detects the vehicle and transmits that signal to the entrance lane controller computer 120. At block 305 the AVI sensor 132 has transmitted an RF signal to the vehicle and from the return, or lack of return, of signal from the vehicle, a decision is made as to whether the sensor 132 can identify the vehicle. If not, the parker, at block 310, pulls a ticket to enter the garage and the present invention system is bypassed.

If the sensor 132 can identify the vehicle, then a decision is made at block 315 by the entrance lane controller computer 120 as to whether the vehicle identification number is authorized by the system. If not, again the parker must pull a ticket, as indicated by block 310, to enter the garage and the automatic vehicle identification system is bypassed. If yes, the host computer 112 at block 320 seeks the parking product that is to be used with this particular vehicle. That information is stored, as stated earlier, in the database 215 of the host computer 112. At block 325 a decision is made by host computer 112 as to whether a permissible product is found in the database 215. If not, again the parker would have to pull a ticket, as indicated at the block 310, to enter the garage and the system would be bypassed. If a permissible product is found by host computer 112, the gate opens as indicated at block 330. At block 335, if the parker wants to override the present system, he simply pulls a ticket to enter the garage. If the parker is using the system, at step 340, the vehicle identification number, date, time, lane number, and product are stored in the host computer 112 where the calculations take place as described earlier.

Figure 4:
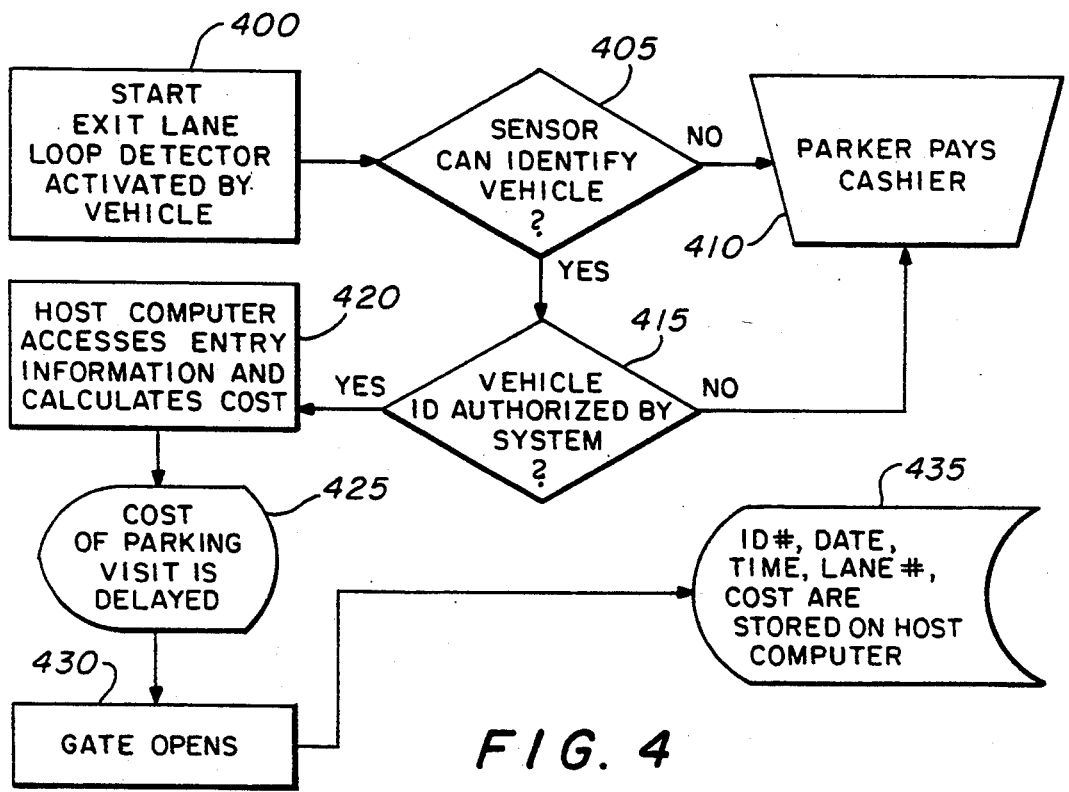
FIG. 4 is a flow chart illustrating the operation of the system as a vehicle approaches the exit lane.

FIG. 4 discloses the system process when a vehicle is operating in the exit lane. At block 400, the exit lane loop detector 144 detects an approaching vehicle and transmits the detection signal to the exit lane controller computer 124. At block 405, the sensor 140 decides whether it can identify the vehicle. If not, the parker has to pay the cashier as indicated at block 410. If the vehicle is identified, a decision is made as indicated at block 415 to see if the vehicle ID is authorized by the system. If not, again, the parker pays the cashier at block 410. If the vehicle is authorized, then, as indicated at block 420, the host computer 112 accesses the entry information stored in database 215 and calculates the cost with accounting system 210. Block 425 indicates that the cost of the parking visit is displayed and, as indicated, at block 430, the gate 146 opens. As indicated, at block 435, the identification number, date, time, lane number, and cost are stored in the host computer database 215.

Thus, there has been disclosed a novel automated parking system which enables a user to enter and leave the parking facility at any specified time with the use of a sensor at the appropriate gate and a tag or transponder on the vehicle that can communicate with the sensor. When a vehicle is detected, the sensor is activated to transmit an interrogation signal, such as an RF signal, toward the vehicle. If the vehicle does not have a tag, the operator of the vehicle can bypass the system by pulling a ticket. If the tag is valid, the gate automatically opens, the vehicle enters and the time of day, the lane number, and vehicle identification number are stored in a host computer. When the vehicle leaves the parking facility, again the vehicle is detected by a loop detector, the sensor is activated to transmit the interrogation signal, the tag on the vehicle responds, and the information is transmitted to the host computer which then calculates the cost of the parking and stores it in an accounting system module such that billing statements can be prepared at a later date. The rate schedule can vary for monthly parkers, duration intervals, days of the week, and duration limits. The rates can be defined however the parking facility desires. Reports are generated as needed on a daily, weekly, or monthly basis and an accurate record is kept for each user of the parking facility.

In summary, with the present invention, a fee calculation system is disclosed that is hands-free (automatic) and time-varied (time dependent) and unilocational (at one particular location). A vehicle reaches a location and is charged a fee based on time-of-day and/or day-of-week. Fee may also vary by particular vehicle (allowing for high occupancy vehicles, volume discounts, et cetera). The entire transaction requires no interaction on the part of the driver or any other vehicle occupant; the process is hands-free and is accomplished through the "automatic" identification of the vehicle. The fee calculation is independent of the fee collection that can take place either before (in the case of debit accounts), after (in the case of charge accounts), or at the time of fee calculation.

The foregoing specification describes only the embodiments of the invention shown and/or described. Other embodiments may be articulated as well. The terms and expressions used, therefore, serve only to describe the invention by example and not to limit the invention. It is expected that others will perceive differences which, while different from the foregoing, do not depart from the scope of the invention herein described and claimed. In particular, any of the specific constructional elements described may be replaced by any other known element having equivalent function.

I claim:

1. An automated vehicle parking system for access and revenue control of a parking facility having controlled entrance lanes and controlled exit lanes, the system comprising:

a device for detecting a vehicle as the vehicle approaches the facility entrance lane;

a sensor for transmitting an interrogation signal to the approaching vehicle;

an electronic tag associated with the vehicle for receiving a transmitted signal and returning a vehicle tag identification signal to the sensor;

a lane controller processor coupled to the sensor and the vehicle detection device for storing data representing the time of day, said lane controller processor activating the sensor upon receipt of a signal representing a detected vehicle, receiving the vehicle tag identification signal from the sensor, and determining if the received vehicle identification signal is valid;

a computer database including data representing current status of each vehicle tag identification, the parking rate schedule for each vehicle tag identification, vehicle entrance time and date, vehicle exit time and date, vehicle parking duration interval including but not limited to 24 hours, 4–24 hours, and 0–4 hours, maximum and minimum vehicle parking duration intervals, parking facility identification, and home parking facility identification;

a computer coupled to the lane controller and the computer database for receiving a valid vehicle tag identification signal, the lane number, and the time of day of entrance of the vehicle to the facility for revenue control purposes and for the generating of a signal to the lane controller system to open or close the lanes; and an accounting module coupled to the computer and including:

an accounts receivable submodule for each of the vehicle identification tags for storing costs and generating periodic billing statements for parking of each identified vehicle;

a rates definition table submodule for defining parameters for a rate calculation algorithm including parking rates for each identified vehicle; and a rate calculation submodule identifying rate schedules for each vehicle account and calculating costs with the rate calculation algorithm based upon appropriate rates and parking times.

2. An automated vehicle parking system as in claim 1 wherein the vehicle detection device comprises a magnetic loop detector for detecting an approaching vehicle and identifying the lane number of the vehicle.

3. An automated vehicle parking system as in claim 1 wherein said accounting module further comprises:

a data report module for generating reports showing parking activity including but not limited to time of day, length of stay, and cost;

a customer maintenance file including address, billing information, and vehicle identification information; and a parking administration submodule for transmitting appropriate response lane signals to the lane controller modules for deactivating lanes, for displaying cost, and printing invoices.

* * * * *

UNITED STATES PATENT AND TRADEMARK OFFICE
CERTIFICATE OF CORRECTION

PATENT NO. : 5,414,624
DATED : May 9, 1995
INVENTOR(S) : Robert B. Anthonyson

It is certified that error appears in the above-indentified patent and that said Letters Patent is hereby corrected as shown below:

In the Drawings:

Figure 3, insert an arrow at the end of the decision line between 315 and 320.

Figure 4, detail 425, change "DELAYED" to --DISPLAYED--.

Column 7, line 4, delete the second occurrence of "the".

Signed and Sealed this

Eighth Day of October, 1996

Attest:

BRUCE LEHMAN

*Attesting Officer*    *Commissioner of Patents and Trademarks*